Nov. 12, 1963  F. M. O. FOERSTER  3,110,282
DEGAUSSING CONTROL
Filed Aug. 24, 1960  3 Sheets-Sheet 1

Inventor
Friedrich M. O. Foerster

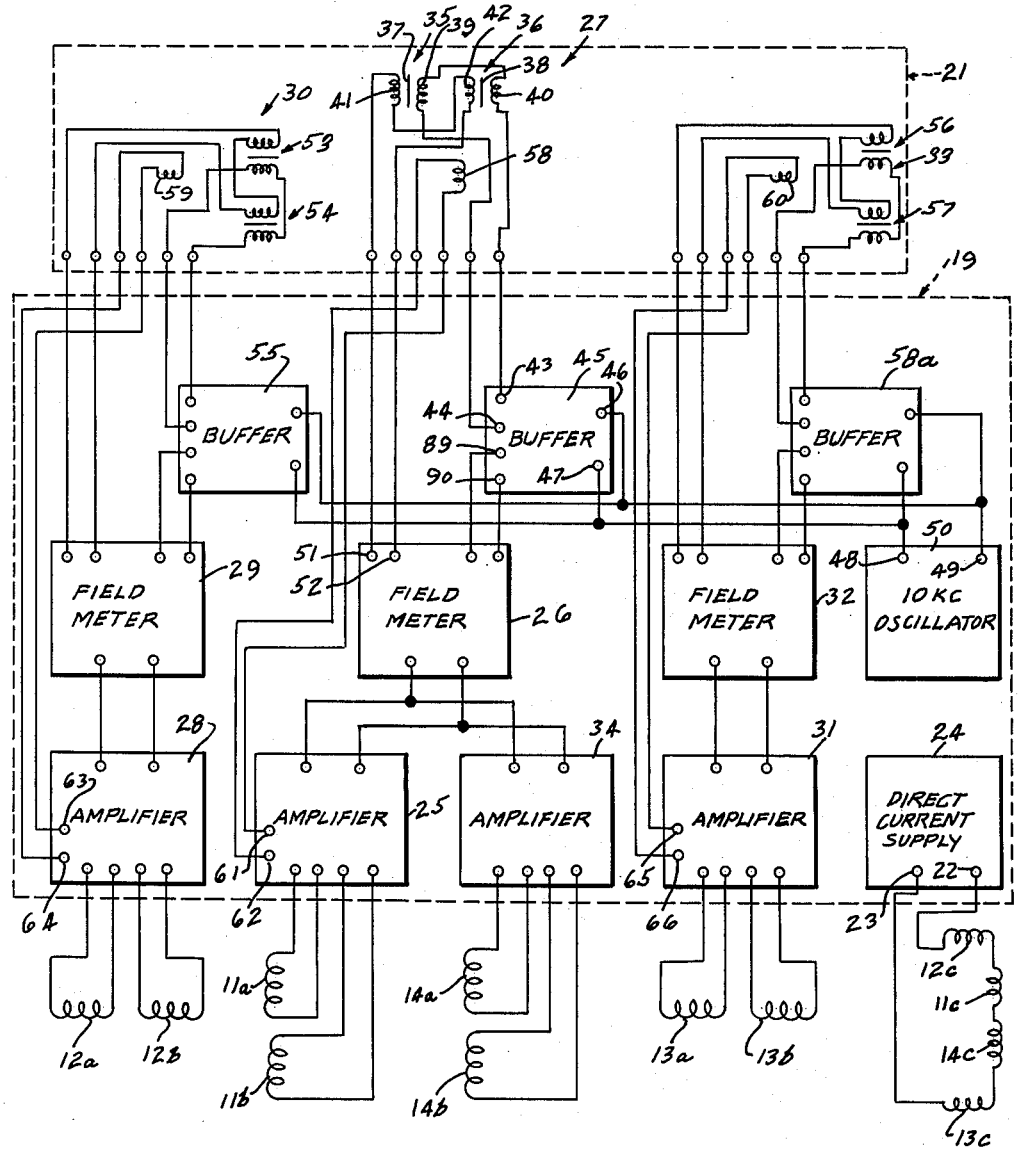

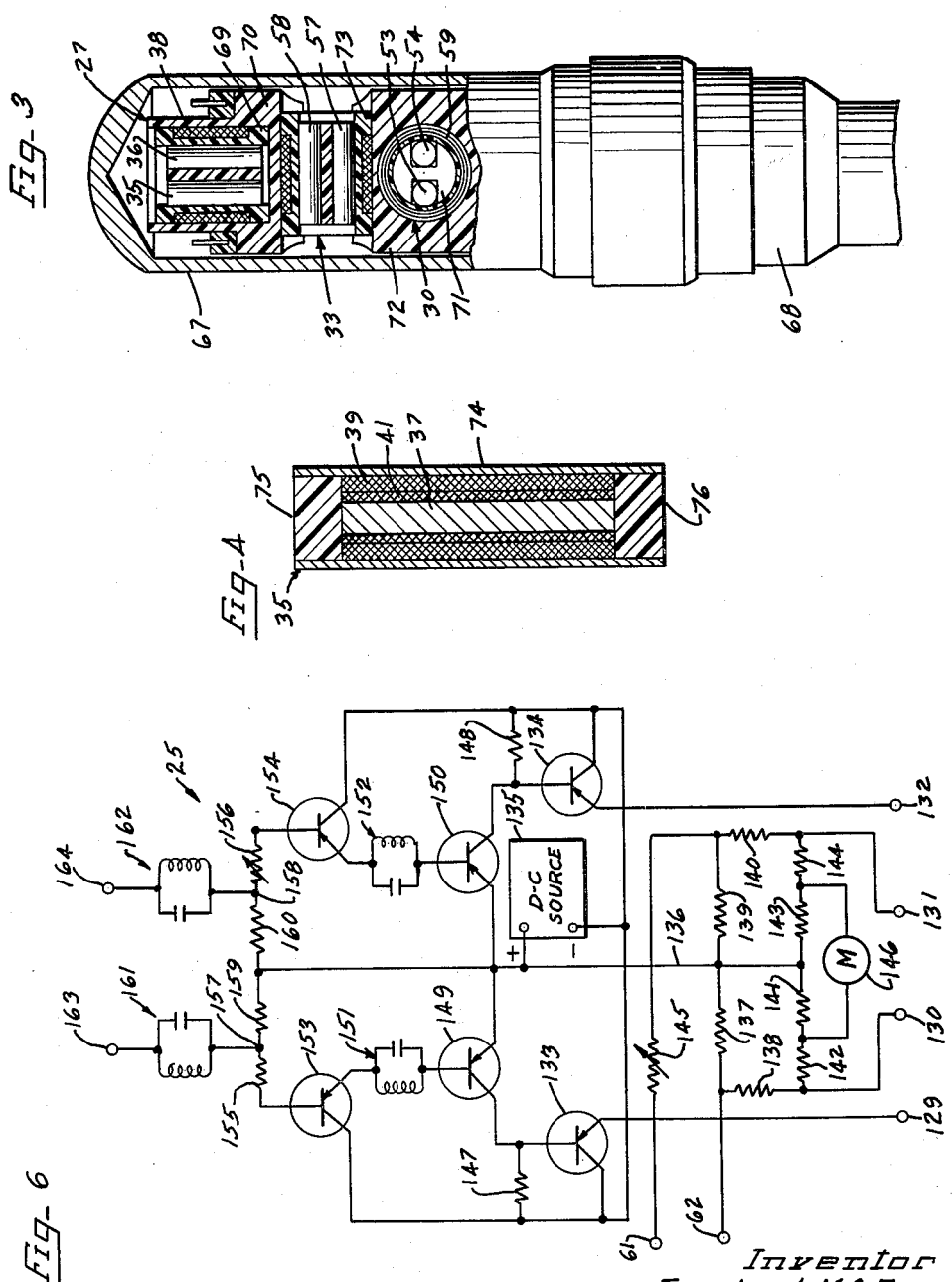

United States Patent Office 3,110,282
Patented Nov. 12, 1963

3,110,282
DEGAUSSING CONTROL
Friedrich M. O. Foerster, Grathwohlstrasse 4,
Reutlingen, Germany
Filed Aug. 24, 1960, Ser. No. 51,673
15 Claims. (Cl. 114—240)

This invention relates to a degaussing control system for compensation of distortions of the earth magnetic field caused by magnetic parts aboard ship, to minimize the danger from magnetic mines and torpedoes.

In one type of degaussing system heretofore employed, windings used for developing a vertical compensating field component are supplied with a current which is permanently adjusted and windings used for developing transverse and longitudinal horizontal field compensating components are adjusted according to the course angle of the compass. With such systems, it is not possible to take into account the pitching and rolling motions of the ship. Furthermore it is necessary to consider, with a map and by means of suitable resistance regulation, the horizontal and vertical components of the earth field present in the specific zone of operation.

In another known system, three earth field components in the direction of three mutually perpendicular axes of the ship are calculated by means of an electronic calculator from the heading, pitching and rolling angles, as well as from the values of the vertical and horizontal components taken from a map and the inclination angle of the earth field. From these calculations, three machine amplifiers are excited for the purpose of feeding the compensation windings.

Both of these known systems have unavoidable inaccuracies and both have the disadvantage of an inevitable time delay between variations in the controlling factors and the application of compensating currents to the windings.

This invention was evolved with the object of providing a rugged and reliable system which provides a continuous, rapid and accurate compensation despite pitching and rolling of the ship, changes in course and variations in the magnitude and angle of the earth field itself.

In accordance with this invention, at least three coil means are provided to develop compensating fields in three mutually perpendicular axes relative to the ship, preferably in a substantially vertical direction, in a horizontal direction longitudinally of the ship and in a horizontal direction transverse to the ship. Each of such coil means comprises one coil used for compensating for a permanent magnetic moment and at least one other coil used for compensating for an induced magnetic moment. The permanent magnetic moment is a distortion of the earth field caused by permanent magnetization of magnetic parts aboard the ship. The induced magnetic moment is a distortion of the earth field caused by concentration of the earth's field through the low reluctance path provided by parts of magnetic material. By compensating for both the permanent and induced moments, complete compensation of the earth's field distortions is obtained.

The permanent magnetic moments are substantially independent of changes in course, pitching or rolling of the ship or changes in the earth's field itself. Accordingly, a substantially constant current is supplied to the permanent compensation coils. It is found that the field required to compensate for the induced component of field distortion in any particular direction is directly proportional to the component of the earth's field in that direction, and in accordance with this invention, a field-measuring probe assembly is located on the tip of the mast of the ship, and is used to measure components of the earth's field independently of the fields produced by the parts aboard ship or the fields produced by the compensating windings. The signals produced by the probe assembly are used to produce directly proportional currents in the induced field compensation windings. Thus a continuous, rapid and accurate compensation is obtained.

An important feature of the invention is in the provision of probes which are very small and readily mounted on the ship's mast, but which are extremely sensitive and accurate in operation, requiring no special magnetic antennas or the like.

Another highly important feature of the invention is in a system for developing in the region of the probes a field which opposes the field being measured and which is proportional to the currents applied to the compensating coils. With this feature, it is found that an extremely linear and stable operation is obtained.

Other important features of the invention are in the use of transistorized amplifiers having no magnetic parts and in themselves requiring no compensation; in the use of push-pull coils and a corresponding circuit applying current thereto; and in a safety circuit which provides an immediate indication in case of failure or mal-function of the field-measuring circuit.

This invention contemplates other and more specific objects, features and advantages which will become more fully apparent from the following detailed description taken in conjunction with the accompanying drawings which illustrate preferred embodiments and in which:

FIGURE 2 is a schematic electrical wiring diagram of the overall system;

FIGURE 3 is a side elevational view, partly in section, illustrating the construction of the probe assembly which is mounted on the top of the mast of the ship;

FIGURE 4 is an enlarged cross-sectional view of a transformer device used in the probe assembly of FIGURE 3;

FIGURE 6 is a schematic electrical diagram of one of the amplifiers used for applying current to one pair of induced field compensating windings.

As shown on the drawings:

Figure 1:
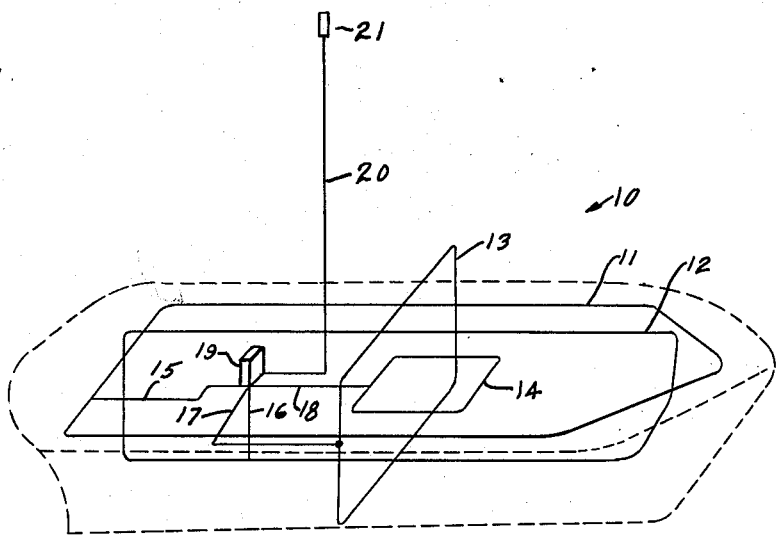
FIGURE 1 is a schematic illustration of the arrangement of the compensating coils and control system on board ship.

In FIGURE 1, reference numeral 10 generally designates the overall degaussing control system of this invention. The system 10 comprises a first coil means 11 extending in a loop about the major part of the ship, in a generally horizontal plane relative to the ship, to develop a magnetic field extending in a vertical direction. Another coil means 12 is disposed in a generally vertical plane relative to the ship, extending longitudinally of the ship, to develop a magnetic field extending transversely relative to the ship. A third coil 13 is arranged in a vertical plane transverse to the ship to develop a magnetic field in a horizontal direction longitudinally of the ship. A fourth coil means 14 is disposed in parallel relation to the coil 11, about the ship's engine which, of course, may cause the principal distortion of the earth's field. Coil means 14 is not absolutely necessary, but is desirable in producing more complete compensation at shallower depths.

The coil means 11, 12, 13 and 14 are respectively connected through cables 15, 16, 17 and 18 to a control unit 19 which is connected through a cable 20 to a field measuring probe assembly 21 mounted on the mast of the ship. Using the signals from the probe assembly 21, the control unit 19 functions to apply proper currents to the coil means 11–14, to completely compensate for distortions of the earth's magnetic field, caused by magnetic parts aboard the ship. It should be noted that since the ship itself forms no part of the invention, its outline is merely indicated in dotted lines in the diagrammatic view of FIGURE 1.

For compensation of the induced components of the earth's field distortion, the coil means 11, 12, 13, and 14 respectively comprise pairs of coils 11a and 11b, 12a and 12b, 13a and 13b, and 14a and 14b, shown diagrammatically at the lower end of FIGURE 2.

For compensation of the permanent components of the distortions of the earth's field, the coil means 11, 12, 13 and 14 respectively include coils 11c, 12c, 13c and 14c. These coils are connected in series to terminals 22 and 23 of a direct current supply 24. They are supplied with a constant current which is adjusted when the ship is at a measurement station, where the actual field distortions due to the magnetic parts of the ship may be accurately measured.

The pair of coils 11a and 11b used for compensation of the vertical component of the induced field distortion, are connected to the output of an amplifier 25 having an input connected to the output of a field meter 26 having an input connected to a vertical probe 27 located in the probe assembly 21 on the ship's mast. Similarly, the coils 12a and 12b are connected to the output of an amplifier 28 having an input connected to a field meter 29 which is connected to a horizontal probe unit 30 within the probe assembly 21, the probe unit 30 being on a horizontal axis transverse to the ship. Coils 13a and 13b are connected to the output of an amplifier 31 having an input connected to the output of a field meter 32 which is connected to a third probe unit 33 disposed within the assembly 21 on a horizontal axis parallel to the longitudinal axis of the ship. Coils 14a and 14b are connected to an amplifier 34 having an input connected to the output of the field meter 26.

Each of the probe units 27, 30 and 33 functions to generate a 20 kc. signal which corresponds in phase and magnitude to the direction and magnitude of a component of the earth's field along the axis of the unit. As diagrammatically shown in FIGURE 2, the probe unit 27 comprises a pair of transformer devices 35 and 36 having cores 37 and 38, primary windings 39 and 40, and secondary windings 41 and 42. Primary windings 39 and 40 are connected in series to output terminals 43 and 44 of a buffer stage 45 having input terminals 46 and 47 connected to output terminals 48 and 49 of a 10 kc. oscillator 50. The secondary windings 41 and 42 are connected in series to input terminals 51 and 52 of the field meter 26.

The primary windings 39 and 40 are connected in series-opposed relation and the secondary windings 41 and 42 are connected in series-aiding relation. In operation, the 10 kc. signals developed in the secondary windings 41 and 42 are effectively cancelled because of the series-opposed relationship of the primary windings 39 and 40. However, even harmonic signals are produced in the secondary windings 41 and 42, in the response to any unidirectional field, such as the earth's field, applied to both cores 37 and 38. The second harmonic signal, i.e. the 20 kc. signal, is used in the illustrated system, but other even harmonics could be used.

The probe units 30 and 33 have the same construction as the probe unit 27. Unit 30 includes a pair of transformer devices 53 and 54 having secondaries connected to the field meter 29 and primaries connected to a buffer stage 55 which has input terminals connected to the output terminals 48 and 49 of the 10 kc. oscillator. Unit 33 includes a pair of transformer devices 56 and 57 having secondaries connected to the field meter 32 and primaries connected to a buffer stage 58a having input terminals connected to the output terminals 48 and 49 of the 10 kc. oscillator 50.

An important feature of the invention is in the provision of means which greatly increase the linearity and stability of the system and its speed of response. According to this feature, a field is developed in the region of each probe unit in opposition to the measured component of the earth's field and in proportion to the current through the corresponding induced field compensation coils. In particular, coils 58, 59 and 60 are respectively incorporated in the probe units 27, 30 and 33 and are arranged to apply fields to both transformer devices of each probe unit. Coil 58 is connected to terminals 61 and 62 of the amplifier 25 and is supplied with a signal proportional to the effective current through the coils 11a and 11b. The circuit of the amplifier 25 is shown in FIGURE 6 and is described in detail hereinafter. Similarly, coil 59 is connected to terminals 63 and 64 of the amplifier 28. Coil 60 is connected to terminals 65 and 66 of the amplifier 31.

It may be noted that a negative or inverse feed-back signal could be applied to the inputs of amplifiers 25, 28 and 31 in proportion to the current through the compensating field coils, as is the case in many amplifier systems, to compensate for non-linearities in the amplifiers, to stabilize the amplifiers and to improve the speed of response. It is of considerable advantage, however, to apply the signals to field-producing means at the probes since such compensates for non-linearities in the overall system, including the probes and the field meter, and increases the stability of the overall system.

The physical construction of the probe units is very important to the operation of the system. The probe assembly 21 is such that it can be readily mounted on the ship's mast outside of the field of the compensation coils since the probe units are small in size and at the same time are highly sensitive so as not to require magnetic antennas or the like. In addition, the probe units are very linear in response and this feature coupled with their high sensitivity, which makes possible the use of negative feed-back as described above, provides an overall system which is very stable, accurate and reliable in operation.

Referring to FIGURES 3 and 4, the probe units 27, 30 and 33 are mounted within a cylindrical housing 67 mounted on the upper end of a vertical support 68 which is rigidly supported on the ship's mast. The transformer devices 35 and 36 are mounted in vertical bores through a vertical spindle 69 which is disposed within a bore of a sleeve 70 within the upper end of the housing 67. The spindle 69 has an exterior recess in which the winding 38 is disposed. Similarly, the transformer devices 53 and 54 of the probe unit 30 are disposed in horizontally extending bores of a spindle 71 which, in turn, is disposed in a horizontally extending bore of a support sleeve 72. The feed-back winding 59 is wound in an exterior recess of the spindle 71. The transformer devices 56 and 57 of the probe unit 33 are disposed in horizontal bores of a horizontal spindle 73. The lower side of the sleeve 70 and the upper side of the sleeve 72 are recessed to receive the spindle 73 therebetween.

FIGURE 4 is a cross-sectional view of the transformer device 35, it being understood that the other devices are constructed in a similar fashion. In the device 35, the primary and secondary windings 39 and 41 are wound on a bobbin-core unit 37 disposed within a sleeve 74 of insulating material. Unit 37 preferably comprises a core of saturable material about 30 mm. long and of rectangular cross-section, about 0.4 mm. thick and 1 mm. wide, embedded in a bobbin which is preferably of a ceramic material. Plugs 75 and 76 may be disposed within the sleeve 74 at opposite ends of the core 37. The probe units are very small. The overall length of the operative portion of the probe assembly, from the upper end of the spindle 69 to the lower end of the spindle 71, is only about 2 inches. Certain features are quite important, to make possible the small size and yet obtain high sensitivity and linear response. It is important that the cores be of a high permeability magnetic material having a low saturation flux density. The alloy known as "Permalloy" is one of such materials. It is further important that the current applied to the primary windings have a peak value which is quite high, at least 1.5 times that required to produce saturation of the core. With these features, it is possible to have a very small probe unit having high sensitivity and linearity in response.

Figure 5:
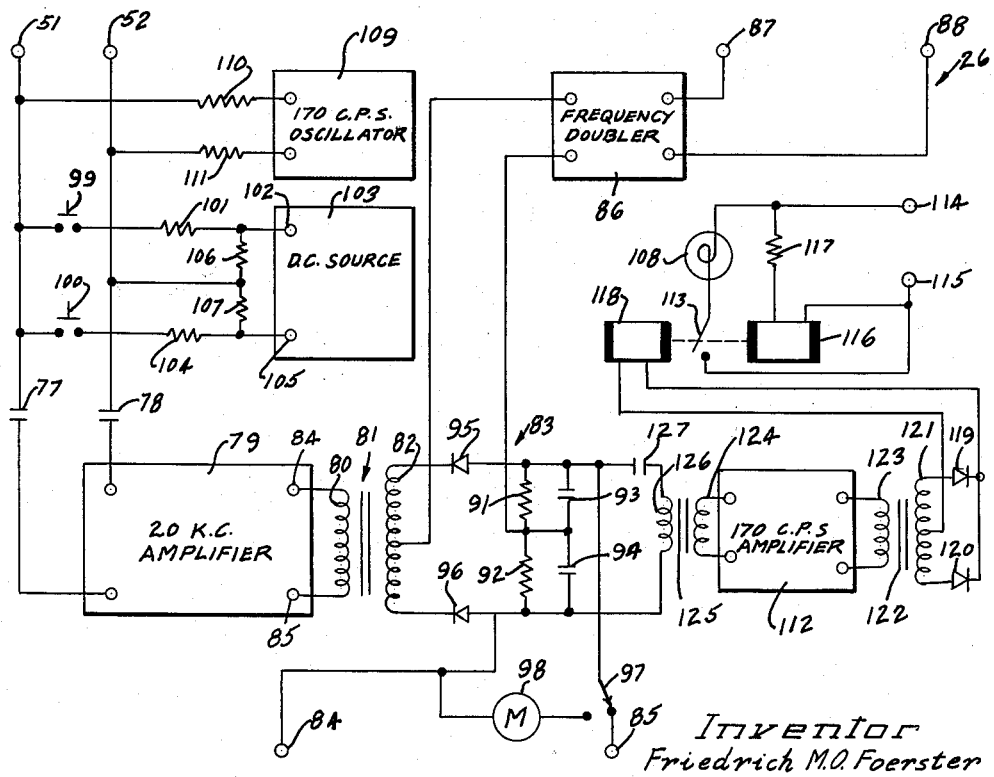
FIGURE 5 is a schematic electrical diagram of one of the field meters used for developing an output signal proportional to the field developed at the probe in one direction.

Each of the field meters 26, 29 and 32 provides a high degree of amplification of the signals from the probe units and at the same time produces a direct current output signal which corresponds in magnitude and polarity to the magnitude and phase of the 20 kc. signal produced by the probe unit. The circuits of all three field meters are the same, the circuit of the field meter 26 being illustrated at FIGURE 5. Referring thereto, input terminals 51 and 52 are connected through capacitors 77 and 78 to input terminals of a 20 kc. amplifier 79 having output terminals connected to the primary 80 of a transformer 81 having a center-tapped secondary winding 82.

The winding 82 supplies an amplified 20 kc. input signal to a phase detector circuit 83 which serves to develop a direct current output signal at terminals 84 and 85 corresponding in magnitude and polarity to the value of the input signal during a certain half-cycle of a control 20 kc. signal from a frequency doubler 86. The input of the frequency doubler 86 is connected to terminals 87 and 88, connected to a pair of output terminals 89 and 90 of the buffer stage 45, connected to the 10 kc. oscillator 50.

The phase sensitive detector 83 comprises a center-tapped impedance across which the output signal is developed. This impedance comprises a pair of resistors 91 and 92, and a pair of capacitors 93 and 94 in parallel therewith. The resistors provide direct current flow paths. The capacitors act as filters and stabilize the circuit. The center-tapped impedance is connected through rectifiers 95 and 96 to the center-tapped secondary winding 82, the center tap of the impedance and the center tap of the winding 82 being connected to the output of the frequency doubler 86.

In operation, the 20 kc. signal from the frequency doubler 86 acts as a switch to prevent conduction of the rectifiers 95, 96 during one half-cycle and to allow conduction thereof during the other half-cycle, one or the other of the rectifiers being then conductive to cause current flow through the resistors 91, 92 in one direction and to correspondingly charge the capacitors 93, 94. When the earth's field at the probe unit 27 lies in one direction, the output terminal 85 will be positive relative to the terminal 84 and when in the reverse direction, the terminal 85 will be negative relative to the terminal 84. The magnitude of the voltage is directly proportional to the magnitude of the earth's field.

To permit calibration of the field meter, a switch 97 is provided to selectively connect the output of the phase detector 83 to a meter 98, while disconnecting the input of amplifier 25 from the output of the phase sensitive detector. With the meter 98 connected, a pushbutton 99 may be depressed to develop a certain field magnitude at the probe unit 27. A certain reading should then be attained at the meter 98. A pushbutton 100 may then be depressed to develop a field of the same amplitude, but of reverse direction, at the probe unit 27, and a corresponding reading should then be developed at the meter 98. It is found that the secondary windings of the probe units may be used for developing such calibrating fields and, in particular, the pushbutton 99 is connected between the input terminal 51 and a resistor 101 connected to one output terminal 102 of a direct current source 103. The pushbutton 100 is connected between terminal 51 and a resistor 104 connected to the other terminal 105 of the source 103. A pair of resistors 106 and 107 of equal value are connected between terminals 102 and 105, the junction thereof being connected to the input terminal 52. With this arrangement, voltages of equal magnitude, but of opposite polarity, are selectively applied to the secondary windings 41, 42 when the pushbuttons 99, 100 are depressed. It is noteworthy that it is possible to use the same secondary windings for developing the output signal and for amplification of the calibrating field, since the application of the direct current to the windings is merely superimposed on the high frequency signal, and does not interfere with the production thereof.

Another important feature of the invention is in the provision of a signal device in the form of a lamp 108 which indicates improper operation or mal-functioning of the field meter. In particular, a low frequency oscillator (170 c.p.s.) is connected through resistors 110 and 111 to the field meter input terminals 51 and 52, so as to develop a low frequency current in the secondary windings and thereby develop a varying field at the probe unit 27, and thereby develop a modulated 20 k.c. signal applied to the input of the field meter. When the circuit properly functions, the 20 k.c. signal, modulated at the low frequency rate, is demodulated by the phase-sensitive detector 83, to develop a low frequency signal at the output thereof. This signal is applied to an amplifier 112 which controls a relay controlling the signal lamp 108. When the operation of the system is proper, the lamp 108 is not energized. However, when the field meter fails in operation, the low frequency signal disappears and the lamp 108 is energized.

In particular, the lamp 108 is connected in series with a relay contact 113 to a pair of terminals 114 and 115 connected to a suitable direct current power supply. A first relay winding 116 is connected in series with a resistor to the terminals 114 and 115, and develops a field which urges the contact 113 toward closed position. The field developed by winding 116 is, however, opposed by the field developed by a winding 118, which when the circuit properly functions, nullifies the effect of the winding 116 and holds the contact 113 in its opened position as illustrated. Coil 118 is connected to the output of a full-wave rectifier including a pair of rectifiers 119 and 120 connected to a center-tapped secondary winding 121 of a transformer 122 having a primary 123 connected to the output of amplifier 112. The input of amplifier 112 is connected to the secondary winding 124 of a transformer 125 having a primary 126 connected in series with a capacitor 127 to the output of the phase-sensitive detector 83.

The transformer primary 126 and the capacitor 127 together form a series resonant circuit, resonant at 170 c.p.s.

The amplifiers 25, 28 and 31 have the same construction, the circuit of the amplifier 25 being illustrated in FIGURE 6. The amplifiers are transistorized which is important in that they have no magnetic parts and, in themselves, require no compensation. Another important feature is that a push-pull circuit is used for energizing the compensation coils, to minimize distortions and improve linearity. In particular, the amplifier 25 has a pair of output terminals 129 and 130 connected to the coil 11a and another pair of output terminals 131 and 132 connected to the coil 11b. Terminals 129 and 132 are connected to the emitters of transistors 133 and 134 having collectors connected to the negative terminal of the direct current source 135. The positive terminal of source 135 is connected to a conductor 136 which is connected through a first pair of resistors 137 and 138 to the terminal 130 and through a second pair of resistors 139 and 140 to the terminal 131 The conductor 136 is further connected through a third pair of resistors 141 and 142 to the terminal 130 and through a fourth pair of resistors 143 and 144 to the terminal 131. The network formed by resistors 137–144 is symmetrical. Thus resistor 137 has a resistance equal to that of resistor 139, etc.

The D.C. source 135, through the transistors 133 and 134, and the network 137–144, applies current to coils 11a and 11b in such directions as to develop fields in opposition to each other. When the current through both coils 11a and 11b is the same, no net field is developed. When the current through transistor 133 exceeds that through transistor 134, a net field is developed in one direction and, conversely, when the current through transistor 134 exceeds that through transistor 133, a net field is developed in the opposite direction. Thus a push-pull action is obtained.

The resistors 137–140 develop a voltage signal directly proportional to the net field developed by the coils 11a and 11b. This signal is applied through a variable resistor 145 to the terminals 61 and 62, which are connected to the coil 58 of the probe unit 27, to develop a field in opposition to the earth's field, and to obtain the advantages discussed above. Resistor 145 controls the sensitivity of the overall system. If its resistance is decreased, the magnitude of the feed-back signal is increased, and the sensitivity is decreased. If the resistance of resistor 145 is increased, the sensitivity of the system is increased. Resistor 145 may be adjusted at a measuring station at which the induced field components may be accurately measured. Once adjusted, the system maintains a direct proportion between a measured component of the earth's field and the field developed by the corresponding compensation coils.

Resistors 141–144 develop a voltage signal proportional to the net field developed by coils 11a and 11b, which is applied to a volt meter 146.

Transistors 133 and 134 are connected to operate as emitter-followers, which is desirable in increasing the linearity and stability of the system. The base electrodes thereof are connected through resistors 147 and 148 to the negative terminal of source 135 and are also connected to collectors of a pair of amplifying transistors 149 and 150 having their emitters connected to the positive terminal of the source 135. The transistors 149 and 150 function to apply to the base electrodes of transistors 133 and 134 amplified signals proportional to the signals applied to the base electrodes thereof. The base electrodes of transistors 149 and 150 are connected through filter circuits 151 and 152 to the emitters of a pair of transistors 153 and 154 which are connected to operate as emitter-followers, the collectors thereof being connected to the negative terminal of the source 135.

The base electrodes of transistors 153 and 154 are connected through resistors 155 and 156 to circuit points 157 and 158 connected through resistors 159 and 160 to the positive terminal of the source 135. Circuit points 157 and 158 are connected through filter circuits 161 and 162 to a pair of input terminals 163 and 164 which are, of course, connected to the output terminals 84 and 85 of the field meter 26.

Resistors 155 and 156 operate as current limiters. Resistor 156 is adjustable to adjust the balance of the circuit. Thus with no voltage applied to the input terminals 163 and 164, resistor 156 may be adjusted to obtain a balance or null of the opposing field developed by compensation coils 11a and 11b.

The filter circuits 151, 152, 161, and 162 serve to reject the principal A.C. components not fully eliminated by the capacitors 93 and 94 of the phase sensitive detector 83, or the series resonant circuits 127 and 128. They are in the form of inductors and capacitors connected in parallel, to form parallel resonant circuits having a resonance frequency equal to that of the principal A.C. components.

As suggested above, each of the amplifiers 28 and 31 has the same construction as amplifier 25. Amplifier 34 is also the same, except that it is not necessary to provide means for developing the feed-back signal.

It will be understood that modifications and variations may be effected without departing from the spirit and scope of the novel concepts of this invention.

I claim as my invention:

1. In a degaussing system for a ship having parts of magnetic material which produce distortions of the earth's field divisible into components including three permanent components and three induced components in three mutually perpendicular directions relative to the ship, a first set of three coil means for developing fields in said three mutually perpendicular directions, means connecting said first set of three coil means to a direct current source to apply a constant current thereto, a second set of three coil means for developing field in said three mutually perpendicular directions, three amplifier means for supplying current to said second set of coil means, a probe assembly, means for mounting said probe assembly on the ship's mast, said probe assembly including three units for developing signals proportional to the components of the earth's field in said three mutually perpendicular directions, and means applying said signals to said amplifier means.

2. In a degaussing system for a ship having parts of magnetic material which produce distortions of the earth's field divisible into components including three induced components in three mutually perpendicular directions relative to the ship, three coil means for developing fields in said three mutually perpendicular directions, three amplifier means supplying current to said coil means, a probe assembly, means for mounting said probe assembly on the ship's mast, said probe assembly including three units for developing signals proportional to the components of the earth's field in said three directions, each of said units comprising a pair of transformer devices each including a core of saturable material and primary and secondary windings thereon, means for connecting said primary windings in series-opposed relation to an alternating current source, means connecting said secondary windings in series-aiding relation to develop an alternating current signal proportional to the measured component of the earth's field and having a frequency which is an even harmonic of the frequency of the signal applied to the primary windings, and means coupling said signal from said secondary windings to said amplifier means.

3. In a degaussing system for a ship having parts of magnetic material which produce distortions of the earth's field divisible into components including three induced components in three mutually perpendicular directions relative to the ship, three coil means for developing fields in said three mutually perpendicular directions, three amplifier means supplying current to said coil means, a probe assembly, means for mounting said probe assembly on the ship's mast, said probe assembly including three units for developing signals proportional to the component of the earth's field in said three directions, each of said units comprising a pair of transformer devices each including a core of saturable material and primary and secondary windings thereon, means connecting said primary windings in series-opposed relation, an alternating current source connected to said primary windings and supplying a current at least 1.5 times that required to produce saturation of said cores, means connecting said secondary windings in series-aiding relation to develop alternating current signals proportional to the measured component of the earth's field and having a frequency which is an even harmonic of the frequency of said alternating current source, and means applying said signals from said secondary windings to said amplifier means.

4. In a degaussing system for a ship having parts of of magnetic material which produce distortions of the earth's field divisible into components including three induced components in three mutually perpendicular directions relative to the ship, three coil means for developing fields in said three mutually perpendicular directions, three amplifier means supplying current to said coil means, a probe assembly, means for mounting said probe assembly on the ship's mast, said probe assembly including three units for developing signals proportional to the components of the earth's field in said three directions, each of said units comprising a pair of transformer devices each including a core of saturable material and primary and secondary windings thereon, means for connecting said primary windings in series-opposed relation to an alternating current source, means connecting said secondary windings in series-aiding relation to develop an alternating current signal proportional to the measured component of the earth's field and having a frequency which is an even harmonic of the frequency of the signal applied to the primary windings, and means coupling said signal from said secondary windings to said amplifier means, each of said cores having a low saturation flux density.

5. In a degaussing system for a ship having parts of magnetic material which produce distortions of the earth's field divisible into components including three induced components in three mutually perpendicular directions relative to the ship, three coil means for developing fields in said three mutually perpendicular directions, three amplifier means supplying current to said coil means, a probe assembly, means for mounting said probe assembly on the ship's mast, said probe assembly including three units for developing signals proportional to the components of the earth's field in said three directions, each of said units comprising a pair of transformer devices each including a core of saturable material and primary and secondary windings thereon, means for connecting said primary windings in series-opposed relation, an alternating current source and supplying a current at least 1.5 times that required to produce saturation of said cores, means connecting said secondary windings in series-aiding relation to develop an alternating current signal proportional to the measured component of the earth's field and having a frequency which is an even harmonic of the frequency of the signal applied to the primary windings, and means coupling said signal from said secondary windings to said amplifier means, each of said cores having a low saturation flux density.

6. In a degaussing system for a ship having parts of magnetic material which produce distortions of the earth's field divisible into components including three induced components in mutually perpendicular directions relative to the ship, three coil means for developing fields in said three mutually perpendicular directions, three transistorized amplifier means for supplying current to said coil means, a probe assembly, means for mounting said probe assembly on the ship's mast, said probe assembly including three units for developing signals proportional to the components of the earth's field in said three mutually perpendicular directions, and means applying said signals to said transistorized amplifier means.

7. In a degaussing system for a ship having parts of magnetic material which produce distortions of the earth's field divisible into components including three induced components in three mutually perpendicular directions relative to the ship, three pairs of coils for developing fields in said three mutually perpendicular directions, an amplifier for supplying current to each of said pairs of coils, comprising a first pair of transistors for respectively applying current to said coils to develop fields in opposite directions with a net field in one direction being produced by greater current through one of said transistors relative to the current through the other, a second pair of transistors arranged to apply amplified push-pull signals to said first pair of transistors, and means for applying control signals to said second pair of transistors.

8. In a degaussing system for a ship having parts of magnetic material which produce distortions of the earth's field divisible into components including three induced components in three mutually perpendicular directions relative to the ship, three coil means for developing fields in said three mutually perpendicular directions, amplifier means for supplying current to said coil means, a probe assembly, means for mounting said probe assembly on the ship's mast, said probe assembly including three units for developing signals proportional to the components of the earth's field in said three mutually perpendicular directions, each of said units comprising a pair of transformer devices each including a pair of cores of saturable material and primary and secondary windings on each of said cores, means connecting said primary windings in series-opposed relation, means connecting said secondary windings in series-aiding relation, a source coupled to said primary windings and arranged to apply thereto an alternating current of a certain frequency, amplifier means coupled to said secondary windings and arranged to amplify a frequency equal to said certain frequency multiplied by an even number, a frequency multiplier coupled to said source and arranged to produce a reference signal at a frequency equal to said certain frequency multiplied by said even number, a phase-sensitive detector responsive to said reference signal and to a signal from the output of said amplifier to produce a direct current output signal corresponding in magnitude and polarity to the magnitude and direction of the field applied to said unit, and means applying said direct current output signals to said amplifier means for supplying current to said coil means.

9. In a degaussing system, a probe unit for developing an output signal corresponding to field strength in the region thereof, a field meter coupled to said probe unit and arranged to produce an output signal corresponding to the strength of said field, means for developing in the region of said probe unit a comparatively weak field fluctuating at a certain frequency, a filter circuit at the output of said field meter tuned to said frequency, means responsive to the output of said filter circuit, and means responsive to said output signal and having a maximum frequency response substantially less than said frequency.

10. In a degaussing system, a probe unit comprising a pair of transformer devices each including a core of saturable material and primary and secondary windings thereon, means for connecting said primary windings in series-opposed relation to an alternating current source having a certain frequency, means connecting said secondary windings in series-aiding relation to develop an alternating current signal proportional to a component of a field parallel to said cores, a field meter responsive to said alternating current signal, means for applying to said secondary windings an alternating current of comparatively low frequency as compared to said certain frequency, and means coupled to the output of said field meter responsive to signals of said low frequency.

11. In a degaussing system for a ship having parts of magnetic material which produce distortions of the earth's magnetic field divisible into components including three induced components in three mutually perpendicular directions relative to the ship, three coil means for developing fields in said three mutually perpendicular directions, three amplifier means supplying current to said coil means, a probe assembly, means for mounting said probe assembly on the ship's mast, said probe assembly including three units for respectively developing signals proportional to components of the earth's field in said three mutually perpendicular directions, means applying said signals to said amplifier means, and means for developing in the region of each of said units a field in opposition to the measured component of the earth's field and in proportion to the current through the corresponding one of said three coil means.

12. In a degaussing system for a ship having parts of magnetic material which produce distortions of the earth's field divisible into components including three induced components in three mutually perpendicular directions relative to the ship, three coil means for developing fields in said three mutually perpendicular directions, three amplifier means supplying current to said coil means, a probe assembly, means for mounting said probe assembly on the ship's mast, said probe assembly including three units for developing signals proportional to the components of the earth's field in said three directions, each of said units comprising a pair of transformer devices each including a core of saturable material and primary and secondary windings thereon, means for connecting said primary windings in series-opposed relation to an alternating current source, means connecting said secondary windings in series-aiding relation to develop an alternating current signal proportional to the measured component of the earth's field and having a frequency which is an even harmonic of the frequency of the signal applied to the primary windings, means coupling said signal from said secondary windings to said amplifier means, and means for developing in both cores of each pair of transformer devices a field in opposition to the measured component of the earth's field and in proportion to the current through the corresponding one of said three coil means.

13. In a degaussing system for a ship having parts of magnetic material which produce distortions of the earth's field divisible into components including three induced components in three mutually perpendicular directions relative to the ship, three pairs of coils for developing fields in said three mutually perpendicular directions, an amplifier for supplying current to each of said pairs of coils including a first pair of amplifying devices for respectively applying current to said coils to develop fields in opposite directions with a net field in one direction being produced by greater current through one of said amplifier devices relative to the current through the other, a probe assembly, means for mounting said probe assembly on the ship's mast, said probe assembly including three units for respectively developing signals proportional to components of the earth's field in said three mutually perpendicular directions, means applying said signals to said amplifier means, and means for developing in the region of each of said units a field in opposition to the measured component of the earth's field and in proportion to the differential in current through the coils of the corresponding pair of coils.

14. In a degaussing system for a ship having parts of magnetic material which produce distortions of the earth's field divisible into components including three induced components in three mutually perpendicular directions relative to the ship, three coil means for developing fields in said three mutually perpendicular directions, three amplifier means supplying current to said coil means, a probe assembly, means for mounting said probe assembly on the ship's mast, said probe assembly including three units for developing signals proportional to the component of the earth's field in said three mutually perpendicular directions, each of said units comprising a pair of transformer devices each including a core of saturable material and primary and secondary windings thereon, means connecting said primary windings in series-opposed relation, an alternating current source connected to said primary windings and supplying a current at least 1.5 times that required to produce saturation of said cores, means connecting said secondary windings in series-aiding relation to develop alternating current signals proportional to the measured component of the earth's field and having a frequency which is an even harmonic of the frequency of said alternating current source, means applying said signals from said secondary windings to said amplifier means, each of said cores having a short length relative to the transverse dimensions thereof and having a low saturation flux density, and means for developing in the region of the cores of each pair of transformer devices a field in opposition to the measured component of the earth's field and proportional to the current through the corresponding one of said coil means.

15. In a degaussing system for a ship having parts of magnetic material which produce distortions of the earth's field divisible into components including three induced components in three mutually perpendicular directions relative to the ship, three pairs of coils for developing fields in said three mutually perpendicular directions, an amplifier for supplying current to each of said pairs of coils and including a pair of amplifier devices for respectively applying current to said coils to develop fields in opposite directions with a net field in one direction being produced by a greater current through one of said transistors relative to the current through the other, a probe assembly, means for mounting said probe assembly on the ship's mast, said probe assembly including three units for developing signals proportional to the components of the earth's field in said three mutually perpendicular directions, means applying said signals to said amplifier means, three coils inductively coupled to said three units, a pair of resistance means connected in series with the coils of each of said pairs to develop voltages proportional to the current therethrough, and means coupling said resistance means to said means inductively coupled to said probe units to develop in the region of each of said units a field in opposition to the earth's field and proportional to the net field produced by the corresponding one of said pairs of coil means.

References Cited in the file of this patent

UNITED STATES PATENTS

| | | |
|---|---|---|
| 2,315,450 | Nyquist | Mar. 30, 1943 |
| 2,406,870 | Vacquier | Sept. 3, 1946 |
| 2,421,583 | Stuart | June 3, 1947 |
| 2,651,021 | Hays | Sept. 1, 1953 |
| 2,743,415 | Williams et al. | Apr. 24, 1956 |
| 2,755,434 | Yetter | July 17, 1956 |
| 2,766,426 | Wilhelm | Oct. 9, 1956 |
| 2,832,041 | Trachtenberg | Apr. 22, 1958 |
| 2,887,540 | Aronson | May 19, 1959 |
| 2,891,502 | Cochran et al. | June 23, 1959 |
| 2,975,360 | Bell | Mar. 14, 1961 |